US007343739B2

(12) United States Patent
Hein et al.

(10) Patent No.: US 7,343,739 B2
(45) Date of Patent: Mar. 18, 2008

(54) METHOD FOR SUPPLYING BEARING COMPONENTS OF A HYDRODYNAMIC CLUTCH WITH LUBRICANT AND CORRESPONDING HYDRODYNAMIC CLUTCH

(75) Inventors: Hermann Hein, Crailsheim (DE);
Marco Fuchs, Crailsheim (DE);
Harald Hoffeld, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 283 days.

(21) Appl. No.: 10/560,443

(22) PCT Filed: May 7, 2004

(86) PCT No.: PCT/EP2004/004871

§ 371 (c)(1),
(2), (4) Date: Dec. 13, 2005

(87) PCT Pub. No.: WO2004/111482

PCT Pub. Date: Dec. 23, 2004

(65) Prior Publication Data
US 2006/0179829 A1    Aug. 17, 2006

(30) Foreign Application Priority Data
Jun. 13, 2003   (DE) ................. 103 27 154

(51) Int. Cl.
*F16D 33/00*   (2006.01)
(52) U.S. Cl. .......................................... 60/339; 60/337
(58) Field of Classification Search ................. 60/330, 60/337, 339
See application file for complete search history.

(56) References Cited

U.S. PATENT DOCUMENTS 2,322,577 A   6/1943   Kuhns et al. ................... 60/54

(Continued)

FOREIGN PATENT DOCUMENTS

DE   874 712   4/1953

(Continued)

OTHER PUBLICATIONS

International Search Report PCT/EP2004/004871 dated Aug. 6, 2004, German serach report 103 27 154.6 dated Apr. 28, 2004.

(Continued)

*Primary Examiner*—Michael Leslie
(74) *Attorney, Agent, or Firm*—Ostrolenk, Faber, Gerb & Soffen, LLP

(57) ABSTRACT

A method for the supplying bearing elements in a hydrodynamic coupling: The coupling includes a primary wheel and a secondary wheel, which together form a working area capable of being filled with operating fluid. An operating fluid system having a direct circulation connecting at least one outlet from the working area to an inlet into the working area. A filling line connectable at least indirectly to the operating fluid source. An emptying line connecting the outlet at least indirectly to the operating fluid source. The filling line and the emptying line are connected via the direct circulation to the inlet and the outlet, together with a lubricant supply system, which is capable of connection to the filling line, and which is supplied with lubricant during all operating modes. At least during the filling mode, the supply of lubricant is via the filing line that is capable of connection to the operating fluid source. In the direct circulation functional mode of the operating fluid, the supply of the lubricant supply system between the outlet and the inlet is effected solely from the direct circulation.

18 Claims, 3 Drawing Sheets

U.S. PATENT DOCUMENTS

| | | | |
|---|---|---|---|
| 2,701,948 A | * | 2/1955 | Iavelli et al. ............... 60/339 |
| 3,204,412 A | * | 9/1965 | Zeidler ....................... 60/367 |
| 4,096,693 A | * | 6/1978 | Kawamoto ................. 60/339 |
| 4,662,175 A | | 5/1987 | Wahl et al. .................. 60/337 |
| 6,725,657 B1 | * | 4/2004 | Kimura et al. ............... 60/339 |

FOREIGN PATENT DOCUMENTS

| | | |
|---|---|---|
| DE | 27 10 927 | 9/1978 |
| DE | 32 12 505 A1 | 10/1983 |
| DE | 34 34 860 A1 | 4/1986 |
| DE | 101 20 477 A1 | 11/2002 |
| EP | 1 229 269 A1 | 8/2002 |
| GB | 896195 | 5/1962 |
| JP | 01299323 A | 12/1989 |

OTHER PUBLICATIONS

English translation of International Preliminary Report on Patentability dated May 11, 2006 for PCT/EP2004/004871.

* cited by examiner

METHOD FOR SUPPLYING BEARING COMPONENTS OF A HYDRODYNAMIC CLUTCH WITH LUBRICANT AND CORRESPONDING HYDRODYNAMIC CLUTCH

CROSS REFERENCE TO RELATED APPLICATION

The present application is a 35 U.S.C. §§ 371 national phase conversion of PCT/EP2004/004871, filed 7 May 2004, which claims priority of German Application No. 103 27 154.6, filed 13 Jun. 2003. The PCT International Application was published in the German language.

BACKGROUND OF THE INVENTION

The invention relates to a method for the supply of lubricant to bearing elements in a hydrodynamic coupling.

Hydrodynamic couplings have previously been disclosed in a plurality of executions for different applications. In order to ensure a reliable function, additional operating circuits, which in their entirety constitute an operating fluid system, are assigned to these in addition to line connections for the purpose of the filling and emptying of the working area. A previously disclosed design of a hydrodynamic coupling comprises at least one primary wheel functioning as a pump wheel and a secondary wheel functioning as a turbine wheel, which together form a toroidal working area, in which the operating fluid is caused to circulate during operation of the hydrodynamic coupling. The resulting circuit is designated as the operating circuit. A circuit which is connected to at least one inlet into the working area and one outlet from the working area, and which serves the purpose of assuring the direct circulation of operating fluid from the working area to the outside and back into the working area during operation of the hydrodynamic coupling, is assigned to the operating circuit for the purpose of cooling the operating fluid. Couplings of this kind are accordingly also referred to as couplings with direct circulation. Cooling devices, for example in the form of heat exchangers or coolers, can be arranged in this circuit, which is executed as a rule as a closed circuit. In addition, at least one supply line is assigned to the operating circuit, and in particular the toroidal working area, which line feeds operating fluid from a container or tank into the operating circuit. This supply line is also designated as a filling line and as such is connected to the operating circuit via the circuit for direct circulation by utilizing this line connection. Also connected to the operating circuit is at least one line for the purpose of emptying. This line is preferably connected to the circuit for direct circulation by making use of a part of the line connections for the direct circulation circuit. Also provided are connecting lines for the supply of lubricant between the container or tank and the individual bearings of the hydrodynamic coupling, which form a so-called lubricant supply system. The lubricant supply system in this case is preferably connected to the filling line. In order to ensure an optimal cooling process or to influence the degree of filling during operation of the hydrodynamic coupling, i.e. by conveying operating fluid from the operating circuit via an external circuit in the form of direct circulation and back to the operating circuit, it is essential for no additional operating fluid to be sucked in in this condition. Means for interrupting the connection between the tank and the operating circuit are provided in the filling line for this purpose, in the simplest case in the form of a valve device with two switching positions. Connection is effected in the direction of flow of the operating fluid from the tank to the operating circuit between the tank and the operating circuit ahead of the means for interrupting the connection between the tank and the operating circuit. A filter device is also provided, which ensures that adequately filtered oil is always available at the bearings in all operating conditions—filling, emptying and direct circulation in normal rating, and in the case of partial filling and possibly in the case of circulation cooling. A major disadvantage of this design, however, is that a proportion of the operating fluid in the form of oil provided for the actual lubrication of the bearings in these conditions finds its way into the operating circuit of the hydrodynamic coupling, which leads to an undesired influence, in particular a change in the level of filling. For the use of hydrodynamic couplings for the purpose of the speed control of a machine, it is then absolutely essential to readjust or set the level of filling via a timed emptying valve. However, this represents a disturbance variable for couplings which utilize direct circulation and which return filling and emptying losses to the operating circuit via the filling line. A balance can only be achieved by resorting to very high timing values for the valve devices. However, this in turn leads to a considerable reduction in the service life of the valve and thus in the availability, i.e. the possible operating life, of the entire system. The cost of the technical control means for such designs is also enormously high.

The object of the invention was thus to develop further a method for the supply of the bearing elements in a hydrodynamic coupling with lubricant in such a way that the level of filling of the hydrodynamic coupling and its mode of operation are influenced not at all or only to an imperceptible extent. The constructive design should accordingly be characterized by a high degree of certainty in ensuring the function of the hydrodynamic coupling, in particular the individual operating phases, and an extended service life for the individual components and a low control and regulation cost.

In accordance with the invention, the supply to the bearing elements of a hydrodynamic coupling comprising at least one primary wheel functioning as a pump wheel and a secondary wheel functioning as a turbine wheel, which together form a toroidal working area for conveying an operating circuit which comes into being during operation, in addition to the supply via the filling line in conditions involving the interruption of the flow of operating fluid between the operating fluid container and the inlet or direct circulation, is effected via a circuit that is already present during operation in order to ensure the conveying or the circulation of operating fluid during operation outside the operating circuit in the form of so-called direct circulation. This means that the supply of lubricant to the bearing elements takes place from the direct circulation. As a rule, this circuit is executed as a closed circuit in this case and connects at least one inlet to an outlet from the hydrodynamic coupling, in particular the toroidal working area. The expressions "inlet" and "outlet" serve a functional purpose in this case and must not necessarily be understood only as constructive features. These are incorporated as a rule in the inner extent of the torus in the wall of the one or more blade wheels and are connected via corresponding channels in the wall of the blade wheels to the external line components, i.e. in lines or channels provided outside the toroidal working area for the purpose of conveying the operating fluid in the direct circulation. Furthermore, at least one filling line is assigned to the hydrodynamic coupling, in particular the toroidal working area, which line is connected to the circuit in the form of direct circulation and is connected via the circuit for direct circulation to at least one inlet into the working area of the hydrodynamic coupling. The circuit for direct circulation constitutes a closed circuit together with the operating circuit. The connection of the filling line to the direct circulation is effected in this case between the outlet and the inlet.

The expression filling line is understood in this case to denote the line which connects the operating fluid source to the direct circulation, i.e. as far as the junction point.

A lubricant supply system is connected to the filling line, which supplies lubricant to at least the bearing elements of the hydrodynamic coupling, and in particular those of the pump wheel and the turbine wheel and the elements that are so arranged as to rotate together with these. The lubricant supply system is supplied, in the event of the disconnection of the filling line from the working area, via the circuit for the direct circulation of operating fluid outside the hydrodynamic coupling, and in particular outside the working area, whereas, in the event of the connection of the filling line to the direct circulation and thus to at least one inlet into the working area via the circuit for direct circulation, the supply of lubricant is provided by utilizing the same source of supply for the operating fluid in each case.

The inventors have recognized that, in the filling and emptying operating modes and in the case of circulation cooling when the operating fluid is being conveyed in the direct circulation from the working area of the hydrodynamic coupling, if necessary via a corresponding cooling device, and back to the working area of the hydrodynamic coupling, the taking of operating fluid from the circuit for the purpose of providing direct circulation from the working area outside the coupling and back into the working area, and the associated losses of operating fluid for the operation of the hydrodynamic coupling and the function in these operating modes, do not play any part for the purposes of bearing lubrication. Lubrication of the bearings is provided in this case on the basis of the energy that is already present in the system in any case for the achievement of the functional mode of the hydrodynamic coupling, i.e. there is no need for an additional device for the supply of lubricant to the bearing elements.

In a further aspect of the invention, the quantity of operating fluid conveyed in the direct circulation and the pressure level which applies there, or a value which characterizes this at least indirectly, are monitored, in conjunction with which monitoring can take place continuously, at intervals or, if necessary, as the need arises, and, where a specified minimum level is not met, a new supply of operating fluid into the operating circuit of the hydrodynamic coupling can be provided by connecting the filling line to the operating circuit. The total operating time of the filling pump can be reduced considerably in this way, because it only needs to be operated when the demand actually exists, which in turn contributes to an increase in the service life of the system as a whole.

According to a further development, means are provided which, during the filling process of the toroidal working area of the hydrodynamic coupling, permit an excess of operating fluid from the filling line into the lubricant system only once a specified pressure has been reached in the system, i.e. in the operating circuit and the direct circulation connected to it. In particular during the start-up procedure of the hydrodynamic coupling, this leads to the lubricant actually provided for the bearing elements finding its way into the operating circuit of the hydrodynamic coupling for as long as the pressure in the direct circulation is lower than the pressure level of the filling pump, which manifests itself in the more rapid filling of the hydrodynamic coupling and an associated improvement in the dynamic system behavior in the drive train.

From the point of view of its design, the hydrodynamic coupling, comprising at least one primary wheel functioning as a pump wheel and a secondary wheel functioning as a turbine wheel, which together form a toroidal working area, in which operating fluid is caused to circulate during operation to form an operating circuit, is executed with an operating fluid system, which includes at least one circuit to convey operating fluid from the working area for the purpose of cooling during operation and its return to the working area in the form of a so-called direct circulation. The operating fluid system also comprises at least one so-called filling line, which connects a source of operating fluid to the operating circuit, i.e. the toroidal working area or an inlet into the toroidal working area. The filling line in this case is preferably connected to the circuit for the direct circulation, in conjunction with which filling takes place using lines belonging to the direct circulation. Here, too, the expression "line" must be understood in a functional sense only, so that channels incorporated into walls are also subsumed under this in addition to pipe-shaped or hose-shaped elements. In order to ensure a stable mode of operation without the need to suck in additional operating fluid during operation, in which a flow of operating fluid from the working area to the working area through an external guiding means outside the toroidal working area is desired for the control of the level of filling and/or for the purpose of cooling, means are provided to assure or interrupt the flow of operating fluid in the filling line between the source of the operating fluid and the inlet or the direct circulation. These means function as means for the connection and disconnection of the filling line to and from the working area, as desired, and in the simplest case comprise a valve device with at least two switching positions. Also connected in accordance with the invention to the filling line is the lubricant supply system, which serves for the supply of the individual bearing elements with lubricant. In order to provide for the supply of the bearing elements with lubricant from the direct circulation, various possibilities exist for the concrete execution and connection of the lubricant system to the filling line and the direct circulation.

According to a first embodiment in accordance with the invention, the lubricant supply system comprises a first connecting line between the filling line and the main lubricant line to the individual bearing elements, in conjunction with which the direction of flow is determined by a valve device, preferably in the form of a nonreturn valve, which blocks the flow in one direction. The connection of the first connecting line is effected in the direction of flow between the source of operating fluid and the working area ahead of the means for providing or interrupting the flow of operating fluid in the filling line and for the connection and/or disconnection of the filling line to and from the operating circuit and the circuit for direct circulation, as desired. The first connecting line can also be a part of the main lubricant line. A second connecting line is also provided, which connects the direct circulation to the lubricant supply system, and is also connected to the filling line, in conjunction with which the connection is effected after the means for providing or interrupting the flow of operating fluid in the filling line and for the connection and/or disconnection of the filling line, as desired, to and from the operating circuit and the circuit for the circulation of the operating fluid. The connection of the second connecting line is effected to the first connecting line in the direction of flow of the operating fluid after the first nonreturn valve. Also provided in the second connecting line is a valve device, which blocks the flow in one direction, preferably in the form of a so-called nonreturn valve. The two nonreturn valves—the first nonreturn valve and the second nonreturn valve—are executed in this case in such a way that only the directions of flow in the direction of the junction point, i.e. the connection of the second connecting line to the first connecting line, are permitted. This solution ensures that, in the event of the disconnection of the filling line from the operating circuit and the direct circulation, for example in the case of the emptying process or also the conveyance of operating fluid from the toroidal working area in the direct circulation and back to the toroidal working area, the supply to the individual bearing elements is maintained via the lubricant system from the part of the operating fluid that is conveyed outside the toroidal working area, i.e. the direct circulation. The lubricant supply system is thus a part of the operating fluid system. The operating fluid is fed for this purpose via the second connecting line into the first connecting line and is unable to flow back in the direction of the source of the operating fluid thanks to the arrangement of the nonreturn valve, but is forced to flow to the individual bearing elements. The possibility also exists in this case for the provision in the filling line that is disconnected from the direct circulation of a feed device which in addition feeds more operating fluid into the lubricant supply system, in conjunction with which feeding takes place via the first connecting line. This is not absolutely essential, however, and it is accordingly possible to dispense with the actuation of the filling pump or the operating fluid circulation pump in this case, in particular in the event of feeding from an operating fluid tank, which is arranged in a position in which it affected by gravity above the actual bearing elements that are to be supplied. In the other case, i.e. in the event of the connection of the filling line to the circuit for direct circulation, and thus the operating circuit, a part of the operating fluid supplied via the filling line for the lubrication of the bearing elements is diverted via the first connecting line for the lubricant supply system, in conjunction with which this first occurs at a time when the pressure in the circuit for the direct circulation is equal to or greater than the pressure at the feed device.

In a further aspect of the invention, in the solution in accordance with the first proposed solution, means for cleaning the operating fluid, for example in the form of filter devices, are provided in the first connecting line. The filter device in this case is positioned in such a way that it is arranged after the connection of the second connecting line.

In accordance with an additional, second proposed solution, the means for providing the supply to the lubricant supply system in the event of disconnection of the filling line from the direct circulation are formed by a pressure-limiting device and a valve device, which blocks the flow in one direction. The pressure-limiting valve is remotely controlled in this case. One advantage is associated with the ability to dispense with an additional oil filter with a pressure switch to ensure the reliability of the operating mode. The possibility of switching off the feed device also exists. The pressure level itself is scarcely higher than in comparison with the embodiment in accordance with the prior art.

The solutions in accordance with the first and second proposed solutions utilize parts of the filling line, in particular between the means for providing or interrupting the flow of operating fluid to the working area, as a rule a valve device, and the connection of the filling line to the direct circulation for the purpose of taking operating fluid from the direct circulation. The expression "filling line" is understood to denote the line which extends from the source of operating fluid to the direct circulation. No part of the filling line is used, on the other hand, in an execution in accordance with the third proposed solution for the purpose of taking fluid from the direct circulation. A separate connecting line is provided for this purpose between the main lubricant line and the direct circulation. The first connecting line is provided in a similar fashion to the two aforementioned proposed solutions. There is no permanent connection in this case, however, and both the first and the second connecting lines are capable of being connected to the main lubricant line. The means used for ensuring the removal of operating fluid from the circuit for direct circulation for the purpose of lubricating bearing elements by feeding into the lubricant supply system is a valve device controlled by means of control pressure. This is arranged between the two connecting lines and the main lubricant line and is preferably executed as a 3/2-way valve. The lubricant supply system again comprises at least one main lubricant supply line, which is capable of connection to the filling line at least indirectly, and preferably directly, however, and is connected to the bearing elements to be lubricated via additional lines. The connection of these via the first connecting line is effected in the direction of flow from the operating fluid source to the toroidal working area ahead of the means for providing or interrupting the flow of operating fluid in the filling line and for the connection and disconnection of the filling line to and from the circuit for the circulation of the operating fluid and with it the filling line to the working area. In the filled state, the valve device of the means for assuring the removal of operating fluid from the circuit for direct circulation is in a switching position which provides a connection between the operating fluid source and the direct circulation. The means for connection and disconnection are also in a switching position which permits connection of the filling line to the direct circulation. The means for connecting or disconnecting the emptying line to or from the direct circulation in this mode interrupt the flow of operating fluid from the direct circulation to the operating fluid source. The filling process in this mode takes place above all via the connecting line between the direct circulation and the filling line. This means that, for as long as the pressure that is present in the direct circulation is lower than the pressure level in the filling pump, no lubricant will be supplied to the lubricant supply system and the operating fluid in its entirety, including the part intended for the lubricant system, will be conveyed to the coupling as a matter of priority. Not until pressure equilibrium has been reached will the lubricant system also receive a supply. This procedure permits filling of the coupling and readiness for service to be achieved rapidly. With the circulation cooling in its functional mode, the connection between the direct circulation and the operating fluid source is also cleared via the emptying line. Here, too, the provision of the operating fluid is effected essentially via the filling line. In the direct circulation mode, both the filling line and the emptying line, and with them the hydrodynamic coupling, are disconnected from the direct circulation. This means that both valve devices in the filling line are brought into the switching position, in which the flow in the filling line is disconnected from the operating fluid source. In this case, the lubricant supply system is also disconnected from the operating fluid source. Selection of the means for assuring the diversion of operating fluid from the direct circulation preferably takes place in this case depending on the prevailing pressure conditions in the direct circulation. The same advantages as in the other two proposed solutions are also derived from this solution.

In all the solutions, furthermore, additional devices can also be arranged in the circuits, for example cooling devices. These are preferably arranged in the direct circulation. In all the solutions, in addition, the sequence preferably proceeds from the lubricant system into the body of the coupling, so that this quantity of operating fluid is capable of being supplied to the direct circulation via feed devices and a dynamic pressure pump. It is possible to provide circulation lubrication in this way.

BRIEF DESCRIPTION OF THE DRAWINGS

The solution in accordance with the invention is described below with reference to the figures. These represent the following in detail.

DESCRIPTION OF PREFERRED EMBODIMENTS

Figure 1:
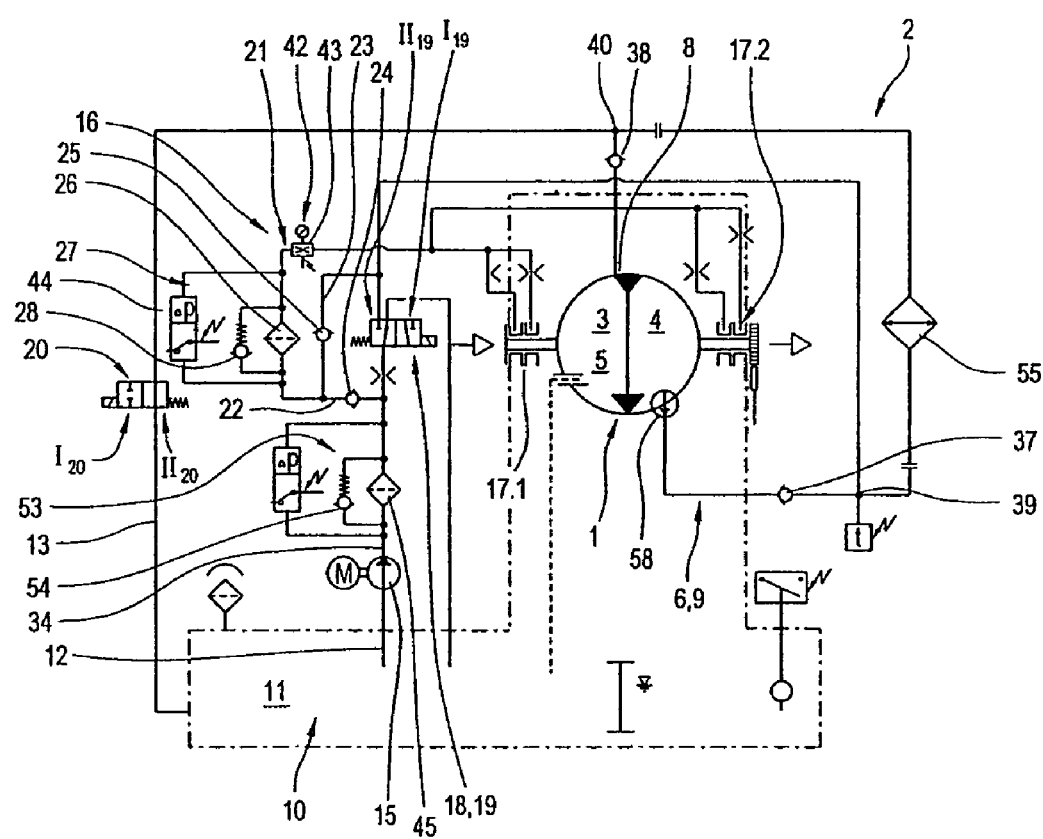
FIG. 1 illustrates in a schematically simplified representation with reference to a hydrodynamic coupling the basic arrangement of the operating fluid system and the integration of the lubricant supply system for the bearing elements into the operating fluid system in accordance with a first proposed solution.

FIG. 1 illustrates in a schematically simplified representation a hydrodynamic coupling 1 with an operating fluid system 2 intended to supply the hydrodynamic coupling 1 with operating fluid and to convey operating fluid. The hydrodynamic coupling 1 comprises at least one primary wheel 3 functioning as a pump wheel and a secondary wheel 4 functioning as a turbine wheel, which together form a preferably toroidal working area 5 capable of being filled with operating fluid. Assigned to the operating circuit that is established in the working area 5 is an external circuit 6, which connects at least one outlet 7 from the toroidal working area to at least one inlet 8 into the toroidal working area. This external circuit 6 is also designated as a direct circulation 9 and may be regarded as a closed circuit in its own right. The direct circulation 9 serves the purpose of conveying operating fluid to and from the toroidal working area 5 during operation. The operating fluid can then be subjected to cooling and in addition, under certain circumstances, to cleaning, in conjunction with which in this case, for example, a cooling device 55 is provided therein. The direct circulation 9 is also utilized in this case to enable variations in the level of filling to be undertaken as the rate of flow in the direct circulation is varied. The operating fluid system 2 also comprises an operating fluid source 10, which is executed in the form of a container or tank 11, for example. The operating fluid source 10 is connected at least indirectly via at least one filling line 12 to the toroidal working area 5, in particular to an inlet 8 in the toroidal working area 5. The connection is effected in this case via the direct circulation 9 and the lines and channels which characterize it. At least one emptying line 13 is also provided for the purposes of emptying, which is connected at least indirectly by means of an outlet 7 to the operating fluid source 10 in the form of the container 11. The connection between the operating fluid source 10 and the inlet 8 is effected in this case by the connection of the filling line 12 to the direct circulation 9 in the direction of flow, observed after the outlet 7 and ahead of the inlet 8. In order to prevent the inward flow of operating fluid into the outlet 7, a nonreturn valve 37 is inserted in the direct circulation 9 ahead of the connection of the filling line 12 to the direct circulation 9 in the direction of flow, observed from the outlet 7 to the inlet 8. This blocks the direction of flow from the connection of the filling line 12 to the direct circulation 9 in the direction of the outlet 7. The connection of the emptying line 13 to at least one outlet 7 is effected in this case by the connection of the emptying line 13 to the direct circulation 9. The connection of the emptying line 13 to the direct circulation 9, regarded in the direction of flow between the outlet 7 and the inlet 8, is effected after the connection of the filling line 12 to the direct circulation 9. In order to prevent the outward flow of operating fluid via the inlet 8, a nonreturn valve 38 is arranged for this in the direction of flow from the outlet 7 to the inlet 8 after the connection of the emptying line 13. Depending on the arrangement of the operating fluid container 11 and the operating fluid source 10 respectively, a feed device 15 in the form of a pump is required in the filling line 12. It is only possible to dispense with a feed device 15 of this kind under certain circumstances in the case of the arrangement of the operating fluid source 10 above the operating circuit or the working area 5 in a position in which it affected by gravity.

Also provided for the coupling 1 is a lubricant supply system 16 for the bearing elements 17 used to support the hydrodynamic coupling, and in particular the bearing elements 17.1 used to support the primary wheel 3 and 17.2 used to support the secondary wheel 4. The lubricant supply system 16 is connected to the operating fluid system 2 and, in a corresponding fashion, to the individual lines and channels for conveying the operating fluid for the removal of lubricant. The connection in this case is effected via the filling line 12.

The connection between the operating fluid source 10 and the inlet 8, i.e. between the filling line 12 and the inlet 8, is capable of interruption. Appropriate means 18 to provide or interrupt the flow of operating fluid between the operating fluid source 10 and the inlet 8, and in particular between the connection of the filling line 12 to the direct circulation 9, i.e. the junction point 39, are provided. These means are used for the connection or disconnection of the filling line 12 to and from the direct circulation 9 and as a rule comprise a valve device 19, which is executed as a 3/2-way valve in the case illustrated here. The valve device 19 thus comprises at least two switching positions, a first switching position $I_{19}$ and a second switching position $II_{19}$. This is also applicable by analogy for the connection between the outlet 7 and the operating fluid source. This is effected via the direct circulation 9. Also provided for this purpose in the emptying line 13 or after the junction point 40 for the connection of the emptying line 13 to the direct circulation 9 is a valve device 20, which also comprises at least two switching positions, a first switching position $I_{20}$ and a second switching position $II_{20}$. This valve device 20 is executed in this case as a 2/2-way valve. A plurality of functional modes of the coupling 1 can be achieved by varying the setting of the switching positions of the valve devices 19 and 20. The filling process in this case is characterized in that the valve device 19 in the filling line 12 in the first switching position $I_{19}$ permits a connection between the operating fluid source 10 and the direct circulation 9, and an associated flow of operating fluid in this direction. In this case, the second valve device 20 is also in its first functional position $I_{20}$, which is characterized by an interruption in the flow of operating fluid in the filling line 13 and an associated disconnection from the operating fluid source 10. The operating fluid in this case is pumped via the feed device in the form of a filling pump or operating fluid circulation pump 15 into the hydrodynamic circuit, in particular the working area 5 and the hydrodynamic circuit that is present there. In the start-up range, i.e. the operating range, which is characterized by a lower pressure in the direct circulation than the level of pressure of the filling pump 15, the operating fluid finds its way into the coupling via the filling line 12. Only in this operating mode is it possible for operating fluid to find its way from the lubricant supply system 16 into the coupling. A rapid filling process is assured in an advantageous fashion in this way.

During operation of the hydrodynamic coupling 1, depending on the prevailing conditions in the working area 5, a circuit in the direct circulation 9 comes into being of its own accord which conveys operating fluid from the working area 5 back into the working area 5 after having conveyed it outside. In order to achieve optimal cooling, the operating fluid is subjected to so-called circulation cooling during operation. For this purpose, the operating fluid that is conveyed from the working area 5 via at least the one outlet 7 is conveyed via a part of the lines of the direct circulation 9 and is fed to the operating fluid container 11 via the emptying line in switching position $II_{20}$ of the valve device 20. It can be subjected to a cooling process in this. The operating fluid that is removed in this way from the circuit that is present in the toroidal working area 5 is also fed via the filling line 12. In this case, the valve device 19 is in the first switching position $I_{19}$. In this way, in addition to the direct circulation 9, a further operating fluid circuit is produced, in which a part of the operating fluid is taken from the direct circulation 9 and is returned once again. In this functional mode, the direct circulation 9 forms a kind of bypass to the operating fluid container 11 for a part of the operating fluid.

For the purpose of emptying, the first valve device 19 is in the second switching position $II_{19}$. In this case, the supply pump supplies fluid from the operating fluid container 11 by circumventing the coupling 1, in particular the operating circuit in the operating fluid container 11. The valve device 20 is in the second switching position $II_{20}$, in which the flow is assured in the emptying line 13 from the outlet 7, in particular from the direct circulation 9, to the container 11.

In order to assure adequate bearing lubrication in all operating modes, the lubricant supply system 16 is integrated into the operating fluid system 2 in a corresponding fashion and is connected to the filling line 12. In order to cover all functional modes, however, the connection is also effected to the lines, or at least to one line, of the direct circulation 9. In the case represented here, in addition to the connection of at least one lubricant line, for example in the form of a main lubricant line 21, to the filling line 12 ahead of the means 18 for interrupting the flow of operating fluid in the direction of flow, observed from the operating fluid source to the working area 5, connection also takes place behind the means 18 for interrupting the flow of operating fluid, i.e. to the part of the filling line 12 that is capable of being connected via the means 18 to the direct circulation 9. The main lubrication line 21 is thus connected directly and via at least one, or even two connecting lines—a first connecting line 22 and a second connecting line 23—to the filling line 12. The first connecting line 22 in this case serves for the connection of the main lubricant line 21 to the filling line 12 ahead of the means 18 for interrupting the operating fluid flow to the working area, and the second connecting line 23 serves for the connection of the direct circulation 9, in particular the filling line 12, to the main lubricant supply line 21, in conjunction with which the connection to the filling line 12 is effected behind the means 18. To indicate the direction of flow, i.e. from the filling line 12 and the direct circulation 9 to the main lubricant supply line 21, appropriate devices are provided in each case, preferably in the form of nonreturn valves. In this case, a first nonreturn valve 24 is arranged in the first connecting line 22 and a second nonreturn valve 25 is arranged in the second connecting line 23. The first nonreturn valve 24 permits the flow of operating fluid from the operating fluid source 10 via the filling line 12, regardless of the switching position of the valve device 19, to the main lubricant supply line 21. The second nonreturn valve 25 also permits the supply, in the second connecting line 23 with the first valve device 19 in switching position $II_{19}$, of the main lubricant supply line 21 with lubricant from the direct circulation 9 via the part of the filling line 12 that is situated behind the means 18 in conjunction with the interruption of the operating fluid flow from the operating fluid source 10 to the inlet 8 through the valve device 19. Also present in the main lubricant supply line 21 in this case is a filter device 26, to which a bypass 27 is assigned. A nonreturn valve 28 is also provided in this bypass 27. This ensures, in the event of blockage of the direction 26 of the filter, that operating fluid finds its way into the main lubricant supply line 21 even if the filter device 26 is circumvented.

During circulation cooling, which is characterized by the conveyance of operating fluid from the working area 5 via the direct circulation 9 and in part via the emptying line 13, the container 11 and once again the filling line 12 to the direct circulation 9 and the inlet 8, the lubricant is also supplied via the filling line 12, and it is thus possible to provide bearing lubrication on an adequate level. Valve device 19 is in switching position $I_{19}$, and valve device 20 is in switching position $II_{20}$. In this case, however, the operating fluid required for lubrication is taken only from the filling line 12, in conjunction with which removal of the fluid takes place both ahead of the means 18 and after the means 18, in each case via the connection points of the individual connecting lines 22 and 23.

During operation without circulation cooling, the lubricant is taken solely from the direct circulation 9. This continues to apply for as long as the pressure in the direct circulation 9 is greater than the pressure generated by the filling pump. Valve device 19 is in switching position $II_{19}$, and valve device 20 is in switching position $I_{20}$. The nonreturn valve 22 in the first connecting line, which is integrated before connection to the second connecting line 23, prevents the flow of operating fluid into the filling line 12.

Additional elements for the performance of additional functions are also provided in all sections of the line. As already explained, means 42 are provided for influencing the rate of flow in the main lubricant supply line 21. These means comprise, for example, an adjustment throttle 43. A filter device 45, to which a bypass 53 is assigned, can also be arranged further down the line section 34 of the filling line 12 of the feed device 15. A nonreturn valve 54 is provided in the bypass. A pressure switch 57 is also assigned to this. These devices serve to ensure the supply of operating fluid, including in the event of a blocked filter 45, by circumventing it.

For the purpose of monitoring a value which characterizes the pressure level in the direct circulation 9 and the quantity of operating fluid at least indirectly, the operating fluid supply system 2 can include means, not illustrated here, for monitoring the pressure level in the operating fluid supply system 2, and in particular in the direct circulation 9. In the event of a fall in pressure in the direct circulation 9, the necessary operating fluid is then topped up via the filling line 12, as the filling line 12 is once again connected to the direct circulation 9. Means 55 are also provided for the cooling of the operating fluid in the direct circulation 9. These means comprise a heat exchanger in the simplest case. A temperature sensor 14 is provided for monitoring the temperature.

Figure 2:
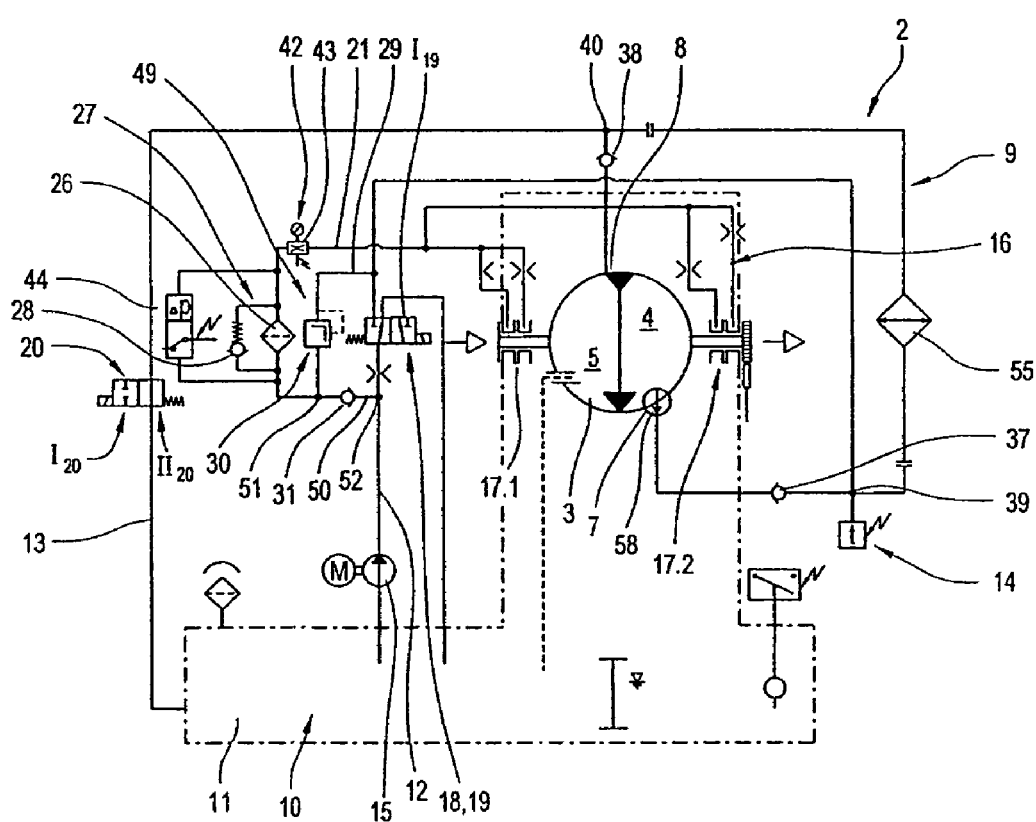
FIG. 2 illustrates in a schematically simplified representation with reference to a hydrodynamic coupling the basic arrangement of the operating fluid system and the integration of the lubricant supply system for the bearing elements into the operating fluid system in accordance with a second proposed solution.

FIG. 2 illustrates an alternative embodiment of the operating fluid system 2 in accordance with FIG. 1 for the provision of the supply of lubricant from the direct circulation 9. The basic arrangement of the coupling 1 and the circuits corresponds in this case to that described in FIG. 1, and for this reason the same reference designations are used for the same elements. In this solution, the main lubricant supply line 21 is connected to the filling line 12 via a connecting line 50, in conjunction with which the connection is effected in the direction of flow between the operating fluid source 10 and the direct circulation 9 observed ahead of the means 18. The main lubricant supply line 21 is also connected, at least indirectly, to the direct circulation 9 via a connecting line 29 to the filling line 12 in the section behind the valve device 19. This connecting line 29 thus forms a bypass 49 for the filling line 12 between the feed device 15 and the connection of the filling line 12 to the direct circulation 9 including the means 18. A pressure-limiting valve 30 is arranged in this. In order to prevent a return flow of operating fluid from the direct circulation 9 into the filling line 12, a nonreturn valve 31 is arranged in the connecting line 50 between the junction point 52 for the connecting line 50 and the filling line 12 and the junction point 51 for the connecting line 29 and the connecting line 50. Also arranged in the main lubricant supply line 21 is a filter device 26, to which a bypass 27 is assigned. A nonreturn valve 28 is also provided in this bypass 27.

A pressure switch 44 is assigned to the bypass 27. This arrangement ensures that operating fluid finds its way into the main lubricant supply line 21, including in the event of blockage of the filter 26.

During the filling process or the operating mode with circulation cooling, the valve device 19 is in the first switching position $I_{19}$. In this position, operating fluid is supplied directly on the one hand from the operating fluid source 10 via the feed device 15, the nonreturn valve 31 and the filter device 26 to the main lubricant supply line 21, in conjunction with which only a part of the operating fluid present in the filling line 21 is taken via these, while the remaining part is supplied via the 3/2-way valve device 19 to the hydrodynamic coupling 1, in particular to the working area 5, by connection to the direct circulation 9. The operating fluid for the bearing elements 17.1, 17.2 supplied as a lubricating oil is only able to find its way into the circuit in the working area 5 during the start-up phase for as long as the pressure in the direct circulation 9 is still in the build-up phase and is thus smaller than the pressure level of the filling pump, i.e. the feed device 15. The removal of operating fluid from the direct circulation 9 takes place, for example, by the interrupted connection of the filling line 12 to the direct circulation 9 via that part of the filling line 12 which is arranged after the means 18, and of the connecting line 29 forming the bypass 33, which is connected after the means 18 to the part of the filling line 12 that is connected to the direct circulation 9. The pressure-limiting valve 30 in this case possesses the same function as the nonreturn valve 25 in FIG. 1.

Figure 3:
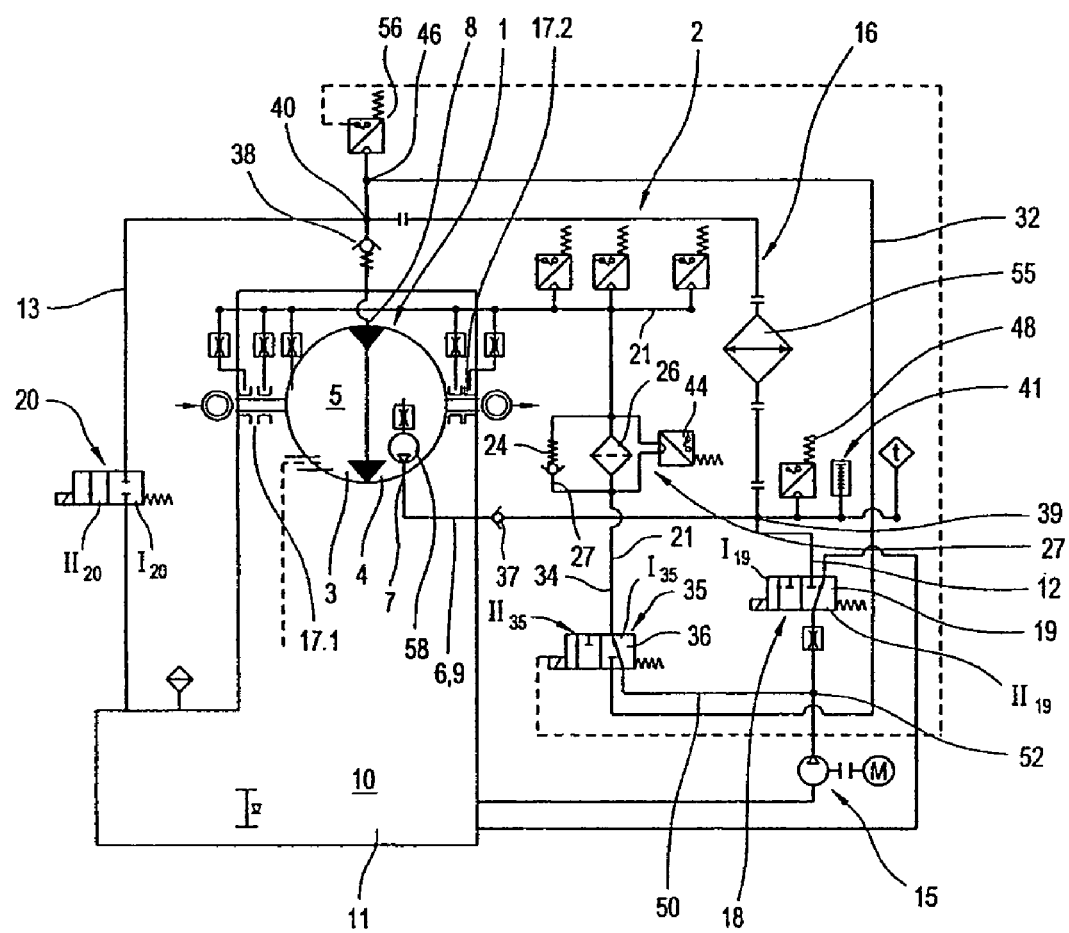
FIG. 3 illustrates in a schematically simplified representation with reference to a hydrodynamic coupling the basic arrangement of the operating fluid system and the integration of the lubricant supply system for the bearing elements into the operating fluid system in accordance with a third proposed solution.

FIG. 3 illustrates a particularly advantageous embodiment of an operating fluid system 2 with a lubricant supply system 16 integrated therein for at least the bearing elements 17.1, 17.2. The basic arrangement in this case corresponds to that described in FIGS. 1 and 2, and for this reason the same reference designations are used for the same elements. In this case, too, the connection of the main lubricant supply line 21 is effected as described in FIG. 2 preferably directly to the filling line 12 ahead of the means 18 for interrupting the connection between the operating fluid source 10 and the direct circulation 9, i.e. for stopping the flow of operating fluid in the filling line 12. A connection via an intermediate line would also be conceivable. Here, too, a connecting line 32 is provided, which assures a connection between the direct circulation 9 and the main lubricant supply line 21. The connection is effected directly in this case and dispenses with the use of any line components of the filling line 12. For the realization of the supply of lubricant via the direct circulation 9 or the filling line 12, as required, an additional valve device 35 is provided here, which is executed as a 3/2-way valve 36 in the case represented here and serves for the connection of the connecting line 32 to the main lubricant supply line 21 or for the connection of the filling line 12 to the main lubricant supply line 21, as required. The connection of the filling line 12 to the main lubricant supply line 21 is effected in the case represented here via a connecting line 50. Its connection to the filling line 12 is effected after the feed device 15 at a junction point 52. The valve device 35 exhibits at least two switching positions. This should preferably be capable of continuously variable control, however. The first switching position of the valve device 35 is designated with $I_{35}$ and serves for the connection between the feed device 15 and the main lubricant supply line 21 via the connecting line 50. In this switching position, the conveyance of the operating fluid from the operating fluid source 10 via the filling line 12 is effected both for the lubricant supply system 16 and, with an appropriately selected switching position on the valve device 19, and in particular the first switching position $I_{19}$, for the supply of operating fluid to the hydrodynamic coupling 1, and in particular to the working area 5, by feeding into the direct circulation 9. Operating fluid will continue to be conveyed via the filling line 12 as a matter of priority. If the valve device 19 is in the second switching position, i.e. if the supply of operating fluid to the hydrodynamic coupling 1, and in particular to the toroidal working area 5, is interrupted and the hydrodynamic coupling 1 operates only with direct circulation 9, the necessary lubricant will be taken directly from the direct circulation 9. The valve device 35 is remotely controlled for this purpose, in conjunction with which the intake from the operating fluid container 11 via the filling line 12, and with it the connecting line 50, is preferably totally interrupted. The transition in this case can be effected either in stages or by continuously variable control, in which case the valve device 35 is controlled in the simplest case, for example, by the pressure that is established in the area of the connection of the connecting line 32 to the direct circulation 9. The supply of operating fluid via the filling line 12 is interrupted in this case. The feed device 15 feeds only into the operating fluid container 11, i.e. the operating fluid source 10, or it may be disengaged completely. The lubricant is then supplied solely from the direct circulation 9 via the connecting line 32 to the main lubricant supply line 21.

For monitoring the temperature in the direct circulation 9, the operating fluid supply system 2 comprises means 41 for monitoring the temperature, in particular of the direct circulation 9 or a line connected thereto.

Also provided is a pressure switch 56 assigned to the direct circulation 9. The function of this is to actuate the valve device 35 depending on the pressure in the direct circulation 9, and by so doing to provide the supply of lubricant either from the direct circulation 9 or via the operating fluid source with the simultaneous disconnection of the filling line 12 from the direct circulation 9.

The control of the means 18 and the other valve devices with regard to their actuation in relation to one another is preferably effected independently as a rule in this case, i.e. in the absence of positive mutual connection. The individual operating modes are realized as follows:

a) Filling

The filling process is implemented by the realization of the connection between the operating fluid tank 11 and the working area 5 via the filling line 12 and the direct circulation 9 with a drive provided to the filling pump 15. The valve device 19 is in the first switching position, as is the valve device 35. The emptying process 13 is interrupted and is separated from the direct circulation 9. The valve device 20 is accordingly in the first switching position. Depending on the dimensioning of 56, the lubricant supply system 16 will continue to be supplied with operating fluid via the operating fluid source 10 as a matter of priority until the pressure arising in the direct circulation 9 is equal to or greater than the pressure level of the filling pump 15. Only then will lubricant be diverted from the direct circulation 9.

b) Direct Circulation

In this operating mode, the connection between the operating fluid container 11 and the direct circulation 9 is interrupted. Feeding and topping-up now no longer take place via the filling line 12. The valve device 18 is in the second switching position, and the valve device 35 is also remotely controlled via the pressure switch 56. The connection of the direct circulation 9 to the operating fluid container 11 is interrupted by the valve device, 20. The operating fluid required as a lubricant is drawn directly from the direct circulation 9. This takes place via the connecting line 32. The operating fluid in this case is preferably conveyed beforehand in the direct circulation 9 via the heat exchanger 55. Depending on the dimensioning of the pressure switch 56, the supply to the lubricant system 16 will continue via this for as long as a specific pressure is maintained in the direct circulation 9, and then only by switching the valve device 35 to the first switching position $I_{35}$ via the operating fluid source 10.

Only when an indication is given that the pressure or another value which characterizes the quantity of operating fluid in the direct circulation 9, at least indirectly, is changing or deviates from a specific, preset value to be maintained in the direct circulation, will the direct circulation 9 be topped up with new operating fluid via the filling line 12. The supply of the lubricant system 16 via the direct circulation 9 takes place in a controlled fashion, and preferably directly depending on the pressure in the direct circulation 9. If this is too low, the coupling 1, and in particular the direct circulation 9 with the filling line 12, will be connected in particular to the section which extends from the operating fluid source 10 to the means 18, i.e. the interruption in the filling line 12 will be discontinued.

The control of the valve device 35 is effected via a pressure switch 56, which is arranged after the junction point 40 and is arranged in the area of the junction point 46 for the connecting line 32 with the direct circulation 9.

c) Emptying

The valve devices 19 and 35 are in a switching position which interrupts the connection of the operating fluid source 10 and the filling line 12 and the flow in the filling line. The emptying line 13 connects the direct circulation 9 to the operating fluid container 11.

d) Circulation Cooling

The valve settings of the valves 19, 35 correspond to those of the filling process. The valve 20 arranged in the emptying line is in the same switching position as for emptying. The lubricant system 16 is supplied with lubricant via the lubricant container 11.

In all the described solutions, delivery of the quantity of bearing lubricating oil is effected into the body of the coupling 1, from where it is supplied via a feed device to a dynamic pressure pump 58 and via this back to the direct circulation 9.

The configurations represented in the Figures are illustrative examples. These may be adapted in respect of the nature and design of individual elements, such as valve devices. A crucial factor is the design of the coupling with direct circulation 9, whereby this is utilized for the provision of the lubricant supply. The level of filling of the coupling can maintained almost constant in this way.

The invention claimed is:

1. A method for the supply of bearing elements in a hydrodynamic coupling, wherein the coupling includes a primary wheel and a secondary wheel, the wheels being shaped and positioned to together form a working area capable of being filled with an operating fluid; an outlet from and an inlet into the working area;

an operating fluid system comprising a direct circulation connecting the outlet from the working area to the inlet into the working area, an operating fluid source and at least one filling line connectable between the inlet into the working area and at least indirectly to the operating fluid source;

at least one emptying line connectable between the outlet from the working area and at least indirectly to the operating fluid source, whereby the filling line and the emptying line are connected via the direct circulation to the inlet and to the outlet, and a lubricant supply system connectable to the filling line; the method comprising supplying lubricant during all operating modes of the coupling, comprising at least during a filling mode, supplying the lubricant supply system via the filing line that is capable of connection to the operating fluid source, the lubricant supply system is supplied solely from the direct circulation in a direct circulation functional mode of the operating fluid between the outlet and the inlet of the working area.

2. The method according to claim 1, further comprising in a circulation cooling mode, during operating fluid flow from the direct circulation and via the emptying line, the lubricant supply system is supplied from the operating fluid source via the filling line.

3. The method according to claim 1, further comprising monitoring the pressure level in the direct circulation and if a predefined limit value is not met, topping-up operating fluid into the direct circulation by connecting the filling line.

4. A hydrodynamic coupling comprising:
a primary wheel and a secondary wheel, which together are shaped to form a working area that is capable of being filled with an operating fluid, the working area having an inlet and an outlet; respective bearing elements supporting the primary wheel and the secondary wheel for rotation;
an operating fluid system, comprising
a direct circulation connecting the outlet from the working area to the inlet into the working area;
an operating fluid source;
at least one filling line, which enables connecting the inlet at least indirectly to the operating fluid source;
at least one emptying line which enables connecting the outlet at least indirectly to the operating fluid source;
the filling line and the emptying line are connected via the direct circulation to the inlet and the outlet;
the operating fluid system comprises a first device operable to provide or interrupt a flow of operating fluid in the filling line from the operating fluid source to the inlet and a second device operable to provide or interrupt the flow of operating fluid in the emptying line between the outlet and the operating fluid source;
a lubricant supply system for supplying lubricant at least to the bearing elements which support the primary wheel and the secondary wheel;
the lubricant supply system is connected to the filling line in the direction of flow after the operating fluid source and before the first device, the supply system is operable to permit or interrupt the flow of operating fluid in the filling line from the operating fluid source to the inlet;
the lubricant supply system is capable of at least indirect connection to the direct circulation;
and a third device operable for diverting the operating fluid from the direct circulation.

5. A hydrodynamic coupling according to claim 4, further comprising:
the lubricant supply system has a main lubrication line capable of connection directly or via a first connecting line via the filling line to the source of operating fluid;
the main lubrication line or the first connecting line is connected in the direction of flow between the operating fluid source and the working area before the first device for permitting or interrupting the operating fluid flow in the filling line to the working area;
the third device which is operable for diverting operating fluid from the direct circulation comprises a second connecting line, which connects the direct circulation to the lubricant supply system; and
the direct circulation is connected to the lubricant supply system directly by the connection of the second connecting line to the main lubricant supply line or indirectly via the first connecting line.

6. The hydrodynamic coupling according to claim 5, wherein the second connecting line is connected to the filling line in the direction of flow from the operating fluid source to the coupling and after the first device for providing or interrupting the operating fluid flow in the filling line to the coupling, and
the connection to the direct circulation is via this part of the filling line.

7. The hydrodynamic coupling according to claim 5, further comprising a fourth device operable for blocking the flow from the direct circulation to the operating fluid source in the main lubricant supply line or the first connecting line in the direction of flow of the operating fluid from the operating fluid source to the main lubricant supply line; and
the second connecting line is connected to the main lubricant supply line or to the first connecting line after the fourth device for blocking the flow from the direct circulation to the operating fluid source.

8. A hydrodynamic coupling according to claim 5, further comprising a fifth device in the second connecting line ahead of the connection to the main lubricant supply line or to the first connecting line and operable for blocking the flow from the direct circulation to the operating fluid source.

9. The hydrodynamic according to claim 8, further comprising a pressure-limiting valve in the second connecting line before the connection to the main lubricant supply line or to the first connecting line.

10. The hydrodynamic coupling according to claim 7, wherein the fourth device comprises a nonreturn valve arranged in at least one of the first and the second connecting line.

11. The hydrodynamic coupling according to claim 5, further comprising:
the second connecting line connects the direct circulation to the lubricant supply system without use of parts of the filling line;
a fifth device operable for connecting the two connecting lines, of the connecting line for connecting between the filling line and the main lubricant supply line, and the fifth device is operable for connecting the connecting line between the direct circulation and the lubricant supply line to the main lubricant supply line.

12. The hydrodynamic coupling according to claim 11, wherein the fifth device comprises a controllable valve.

13. The hydrodynamic coupling according to claim 12, wherein the controllable valve has at least two switching positions for selectively connecting the main lubricant supply line to the filling line or to the direct circulation.

14. The hydrodynamic coupling according to claim 4, further comprising a filter device in the main lubricant supply line, and a pressure switch in a bypass in the main lubricant supply line.

15. The hydrodynamic coupling according to claim 4, further comprising a feed device in the filling line, and the connections of the connecting lines, are after the feed device.

16. The hydrodynamic coupling according to claim 4, further comprising a recorder for a pressure level in the direct circulation.

17. The hydrodynamic coupling according to claim 4, further comprising at least one diaphragm arranged in the main lubricant supply line.

18. The hydrodynamic coupling according to claim 4, further comprising a temperature recorder in the direct circulation.

* * * * *